US006560634B1

(12) United States Patent
Broadhurst (10) Patent No.: US 6,560,634 B1
(45) Date of Patent: May 6, 2003

(54) METHOD OF DETERMINING UNAVAILABILITY OF AN INTERNET DOMAIN NAME

(75) Inventor: Larry Joe Broadhurst, Humble, TX (US)

(73) Assignee: VeriSign, Inc., Mountain View, CA (US)

( * ) Notice: Subject to any disclaimer, the term of this patent is extended or adjusted under 35 U.S.C. 154(b) by 1 day.

(21) Appl. No.: 09/133,836

(22) Filed: Aug. 13, 1998

Related U.S. Application Data (60) Provisional application No. 60/055,787, filed on Aug. 15, 1997.

(51) Int. Cl.[7] .............................................. G06F 15/16
(52) U.S. Cl. ........................ 709/203; 709/217; 709/219
(58) Field of Search ................................ 709/217, 224, 709/223, 219, 245, 227, 249, 203; 707/104, 500, 505

(56) References Cited

U.S. PATENT DOCUMENTS

| | | | | |
|---|---|---|---|---|
| 5,895,471 A | * | 4/1999 | King et al. .................. | 707/104 |
| 5,983,351 A | * | 11/1999 | Glogau ........................ | 713/201 |
| 6,023,698 A | * | 2/2000 | Lavey, Jr. et al. ............ | 707/10 |
| 6,205,482 B1 | * | 3/2001 | Navarre et al. ............. | 709/227 |

OTHER PUBLICATIONS

Jeff Ubois; Registration Services Offer Instant Global Presence; Midrange Systems; Spring House, Nov. 1997.*
Industry Struggles to Simplify Domain Name Registration Process; Electronic Messaging News; Potomac, Aug. 1997.*
Mantle, Ray A; Radin, Mitchell E; Domain Names and Trademark Law; Managing Intellectual Property; London, 1996.*
Netowrk Solutions and Versign Launch Combined Internet Name and Certification Registration; Internet World, Los Angeles, Ca, Mar. 10, 1997.*
Network Solutions and Leading ISPs Launch Premier Domain Registration Service Program; Internet World, Los Angeles, CA, Mar. 11, 1997.*

* cited by examiner

*Primary Examiner*—Glenton B. Burgess
*Assistant Examiner*—Tod Kupstas
(74) *Attorney, Agent, or Firm*—Kenyon & Kenyon (57) ABSTRACT

Methods, systems, and articles of manufacture consistent with the present invention provide an improved query server that overcomes the shortcomings of existing domain name searching techniques by performing a multitude of searches simultaneously, transparent to the user. Specifically, the improved query server searches for existing domain name records in various domains and then displays the results in a formatted manner, thus eliminating the need for a user to perform individual searches.

17 Claims, 9 Drawing Sheets

--- idNames.com™

SEARCH FOR A NAME

TOP 50 COUNTRIES RANKED BY ANNUAL GROSS DOMESTIC PRODUCT

ENTER NAME: [         ]   [SEARCH]

ENTER YOUR NAME IN THE TEXT BOX (WITHOUT EXTENSIONS). FOR EXAMPLE, ENTER "yourname" NOT "www.yourname.com". CLICK ON THE "SEARCH" BUTTON TO SEARCH THE TOP 50 COUNTRIES RANKED BY ANNUAL GROSS DOMESTIC PRODUCT.

| | | |
|---|---|---|
| 1. USA | 18. IRAN | 35. SWITZERLAND |
| 2. JAPAN | 19. TURKEY | 36. AUSTRIA |
| 3. CHINA | 20. NETHERLANDS | 37. HONG KONG |
| 4. GERMANY | 21. ARGENTINA | 38. BANGLADESH |
| 5. INDIA | 22. TAIWAN | 39. NIGERIA |
| 6. UNITED KINGDOM | 23. PAKISTAN | 40. PORTUGAL |
| 7. FRANCE | 24. SOUTH AFRICA | 41. DENMARK |
| 8. ITALY | 25. POLAND | 42. CHILE |
| 9. BRAZIL | 26. UKRAINE | 43. ALGERIA |
| 10. MEXICO | 27. BELGIUM | 44. NORWAY |
| 11. RUSSIA | 28. VENEZUELA | 45. GREECE |
| 12. CANADA | 29. SAUDI ARABIA | 46. MOROCCO |
| 13. INDONESIA | 30. COLOMBIA | 47. VIET NAM |
| 14. SPAIN | 31. MALAYSIA | 48. FINLAND |
| 15. SOUTH KOREA | 32. SWEDEN | 49. CZECH REPUBLIC |
| 16. AUSTRALIA | 33. PHILIPPINES | 50. SYRIA |
| 17. THAILAND | 34. EGYPT | |

FIG. 4 idNames.com™

SEARCH FOR A NAME

SEARCH THE WORLD
(OVER 400 DOMAINS AT ONCE)

ENTER NAME: [          ]  [SEARCH]

ENTER YOUR NAME IN THE TEXT BOX (WITHOUT EXTENSIONS). FOR EXAMPLE, ENTER "yourname" NOT "www.yourname.com". CLICK ON THE "SEARCH" BUTTON TO SEARCH OVER 400 DOMAINS, WORLDWIDE!

FIG.5A idNames.com™

SEARCH FOR A NAME

TOP 50 COUNTRIES RANKED BY ANNUAL GROSS DOMESTIC PRODUCT

ENTER NAME: [       ]  [SEARCH]

ENTER YOUR NAME IN THE TEXT BOX (WITHOUT EXTENSIONS). FOR EXAMPLE, ENTER "yourname" NOT "www.yourname.com". CLICK ON THE "SEARCH" BUTTON TO SEARCH THE TOP 50 COUNTRIES RANKED BY ANNUAL GROSS DOMESTIC PRODUCT.

1. USA
2. JAPAN
3. CHINA
4. GERMANY
5. INDIA
6. UNITED KINGDOM
7. FRANCE
8. ITALY
9. BRAZIL
10. MEXICO
11. RUSSIA
12. CANADA
13. INDONESIA
14. SPAIN
15. SOUTH KOREA
16. AUSTRALIA
17. THAILAND
18. IRAN
19. TURKEY
20. NETHERLANDS
21. ARGENTINA
22. TAIWAN
23. PAKISTAN
24. SOUTH AFRICA
25. POLAND
26. UKRAINE
27. BELGIUM
28. VENEZUELA
29. SAUDI ARABIA
30. COLOMBIA
31. MALAYSIA
32. SWEDEN
33. PHILIPPINES
34. EGYPT
35. SWITZERLAND
36. AUSTRIA
37. HONG KONG
38. BANGLADESH
39. NIGERIA
40. PORTUGAL
41. DENMARK
42. CHILE
43. ALGERIA
44. NORWAY
45. GREECE
46. MOROCCO
47. VIET NAM
48. FINLAND
49. CZECH REPUBLIC
50. SYRIA

FIG.5B

SEARCH RESULTS: MERCEDES — 602

| NAME | RESULTS | DOMAIN DESCRIPTION | REGISTER |
|---|---|---|---|
| MERCEDES.com.au | REGISTERED | AUSTRALIA COMMERCIAL | |
| MERCEDES.co.nz | REGISTERED | NEW ZEALAND COMMERCIAL | |
| MERCEDES.com.sg | REGISTERED | SINGAPORE COMMERCIAL | |
| MERCEDES.net.au | AVAILABLE | AUSTRALIA NETWORKS | REGISTER NOW |
| MERCEDES.org.au | AVAILABLE | AUSTRALIA ORGANIZATIONS | REGISTER NOW |
| MERCEDES.com.cn | AVAILABLE | CHINA COMMERCIAL | REGISTER NOW |
| MERCEDES.net.cn | AVAILABLE | CHINA NETWORKS | REGISTER NOW |
| MERCEDES.org.cn | AVAILABLE | CHINA ORGANIZATIONS | REGISTER NOW |
| MERCEDES.com.hk | AVAILABLE | HONG KONG COMMERCIAL | REGISTER NOW |
| MERCEDES.net.hk | AVAILABLE | HONK KONG NETWORKS | REGISTER NOW |
| MERCEDES.org.hk | AVAILABLE | HONG KONG ORGANIZATIONS | REGISTER NOW |
| MERCEDES.co.id | AVAILABLE | INDONESIA COMMERCIAL | REGISTER NOW |
| MERCEDES.net.id | AVAILABLE | INDONESIA NETWORKS | REGISTER NOW |
| MERCEDES.co.jp | AVAILABLE | JAPAN COMMERCIAL | REGISTER NOW |
| MERCEDES.com.my | AVAILABLE | MALAYSIA COMMERCIAL | REGISTER NOW |
| MERCEDES.net.my | AVAILABLE | MALAYSIA NETWORKS | REGISTER NOW |
| MERCEDES.org.my | AVAILABLE | MALAYSIA ORGANIZATIONS | REGISTER NOW |
| MERCEDES.net.nz | AVAILABLE | NEW ZEALAND NETWORKS | REGISTER NOW |
| MERCEDES.org.nz | AVAILABLE | NEW ZEALAND ORGANIZATIONS | REGISTER NOW |
| MERCEDES.ph | AVAILABLE | PHILIPPINES | REGISTER NOW |
| MERCEDES.co.kr | AVAILABLE | REPUBLIC OF KOREA COMMERCIAL | REGISTER NOW |
| MERCEDES.net.sg | AVAILABLE | SINGAPORE NETWORKS | REGISTER NOW |
| MERCEDES.org.sg | AVAILABLE | SINGAPORE ORGANIZATIONS | REGISTER NOW |
| MERCEDES.com.tw | AVAILABLE | TAIWAN COMMERCIAL | REGISTER NOW |
| MERCEDES.net.tw | AVAILABLE | TAIWAN NETWORKS | REGISTER NOW |
| MERCEDES.org.tw | AVAILABLE | TAIWAN ORGANIZATIONS | REGISTER NOW |
| MERCEDES.co.th | AVAILABLE | THAILAND COMMERCIAL | REGISTER NOW |

FIG.6A

WHOIS INFORMATION

WHOIS: MERCEDES.com.au (AUSTRALIA COMMERCIAL)

| | |
|---|---|
| domain: | mercedes.com.au |
| descr: | MERCEDES-BENZ (AUSTRALIA) PTY LTD |
| descr: | PO BOX 214 MULGRAVE VICTORIA 3170 |
| admin-c: | AB1-AU |
| zone-c: | AB1-AU |
| changed: | hostmaster@aunic.net 960326 |
| source: | AUNIC |
| | |
| person: | ANDREW BIRCH |
| address: | MERCEDES-BENZ (AUSTRALIA) PTY LTD |
| address: | PO BOX 214 |
| address: | GLEN WAVERLY |
| address: | VIC 3150 |
| address: | AU |
| phone: | +61 3 566 9389 |
| fax-no: | +61 3 566 9147 |
| email: | mb-net-au@aunic.net |
| nic-hdl: | AB1-AU |
| changed: | hostmaster@aunic.net 940314 |
| source: | AUNIC |

FIG.6B

COUNTRY BY COUNTRY ORDER FORM

NAME OF PERSON COMPLETING THIS FORM

NAME [ ]

EMAIL [ ]

PHONE [ ]

FAX (OPTIONAL) [ ]

DOMAIN NAME:

DOMAIN NAME [ MERCEDES ]

| COUNTRY | COMMERCIAL SUB-DOMAIN IF REQUIRED | ccTLD | NSI SERVICE FEE | INITIAL REGISTRY FEE | REGISTRY MAINT. FEE | MULTIPLE NAMES ALLOWED | COMMENTS |
|---|---|---|---|---|---|---|---|
| ☐ PHILIPPINES | COM | PH | 249 | 40 | 0 | YES | |

CREDIT CARD INFORMATION

NAME ON CARD [ ]

EXPIRATION DATE [ ]

ACCOUNT NUMBER [ ]

ZIP CODE* [ ]

(*THIS ONLY APPLIES TO CUSTOMERS WITHIN THE UNITED STATES. PLEASE ENTER THE ZIP CODE TO WHICH YOUR CREDIT CARD STATEMENT IS MAILED.)

○ VISA   ○ MASTERCARD   ○ AMERICAN EXPRESS

[ SUBMIT THIS FORM ]   [ RESET THIS FORM ]

FIG.6C

METHOD OF DETERMINING UNAVAILABILITY OF AN INTERNET DOMAIN NAME

RELATED APPLICATIONS

Provisional U.S. Patent Application No. 60/055,787, entitled "Method of Determining Unavailability of an Internet Domain Name," filed on Aug. 15, 1997, is relied upon and is incorporated by reference in this application.

BACKGROUND OF THE INVENTION

A. Field of the Invention

This invention relates generally to data processing systems and, more particularly, to a method for determining if an Internet domain name has been registered in a specific domain.

B. Description of the Related Art

Internet domain names are related to Internet Protocol (IP) numerical addresses. Every "host" that is linked directly to the Internet (e.g., computers) must be identified by a specific IP numerical address. Data transmission over the Internet is in fact accomplished by directing the data to such numerical addresses. An IP address includes four numbers separated by periods. Currently, each number must be between 0 and 255.

Numerical addresses, however, are difficult for humans to remember. Consequently, a domain name may be used as part of what amounts to a type of mnemonic for that IP address. For example, the domain name infoway.com, forms part of ns.infoway.com, which is an easier-to-remember mnemonic for the host located at IP address 207.90.216.53. In this way, the mnemonic is at least roughly analogous to the letters that are sometimes used to signify a specific telephone number, e.g., 1-800-FLOWERS is a mnemonic for 1-800-356-9377.

The availability of Internet domain names (e.g., "ibm.com," "microsoft.com," "netscape.com," etc.) is now a significant business issue, because a domain name is the identifier by which an individual, a company, a governmental entity, an educational institution, etc. (referred to collectively as simply "companies") can be found on the Internet.

As is well known in the art, minor variations in a name can be registered with the InterNIC as domain names. The InterNIC, is a registration service for registering domain names located at Network Solutions, Inc., Herndon, Va. For example, it has been reported that the domain names 1-800-DENTIST.COM and 1800DENTISTCOM are owned by two different entities.

In addition, companies. that have, or aspire to have, an international Internet presence must keep in mind the domain name scheme in other countries. For example, it has been reported that "apple.com" and "apple.co.uk" are owned by different companies, as are "apple.net" and "apple.org."

Domain names are specific to a domain, which is a geographic area defined at a global-level or at a country-level. A global-level domain covers all countries worldwide. Examples of global-level domains include .com, .edu, .gov, and .org. A country-level domain covers only a given country. Examples of country-level domains include .us for the United States and .fr for France. Additionally, country-level domains may contain an indication of a sub-domain within the domain. When a sub-domain is specified for a domain name, the domain name is recognized only in that sub-domain and not the domain that it is a part of.

The term "domain name system" (DNS) refers to a distributed database that is responsible for translating the Internet names into numerical addresses (e.g., 207.90.216.53), routing mail to its proper destination and many other services. The DNS comprises DNS servers or other machines that runs software permitting it to query a database (hosted either locally or on another machine) referred to as a DNS database. The DNS database contains records associating particular domain names with specific Internet Protocol (IP) numerical addresses (e.g., 207.90.216.53).

A user that wishes to check the availability of a domain name in, for example, five different countries will typically submit a separate Whois query, or its equivalent, to the domain-name registration authority in each country. Whois queries provide a way of finding registering organization names, e-mail addresses, administrative technical and billing contacts, postal addresses, and telephone numbers, of those who have registered domain names. Whois is available for use from "http://rs.intemic.org," and available for download at "http://www.shareware.com." The queries might be automated to the extent that the countries in question support automated electronic queries (e.g., via a Web browser form), but in other countries the queries must be initiated by some other means, e.g., FAX, mail, email, phone call, etc. In either case, to perform a query for registered domain names in multiple countries, a user would have to submit a separate search request to each domain, thus making the searching process very time-consuming and cumbersome. It is therefore desirable to improve systems that search for domain names.

SUMMARY OF THE INVENTION

Methods, systems, and articles of manufacture consistent with the present invention provide an improved query server that overcomes the shortcomings of existing domain name searching techniques by performing a multitude of searches simultaneously, transparent to the user. Specifically, the improved query server searches for an existing domain name records in various domains and then displays the results in a formatted manner, thus eliminating the need for a user to perform individual searches.

In accordance with methods consistent with the present invention, a method is provided in a data processing system with DNS servers, each responsible for maintaining registration records of domain names for an associated domain. This method receives user input containing a domain name and specified ones of the domains, transmits a request for a search of the domain names to the DNS servers associated with the specified domains, receives search results from the DNS servers associated with the specified domains, and displays the search results. The search results indicate, for each of the specified domains, whether a domain name record exists in the specified domain.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 6a–6c depict example display outputs in accordance with methods and systems consistent with the present invention.

DETAILED DESCRIPTION

The following detailed description of the invention refers to the accompanying drawings. Although, the description includes exemplary implementations, other implementations are possible, and changes may be made to the implementations described without departing from the spirit. and scope of the invention. The following if detailed description does not limit the invention. Instead, the scope of the invention is defined by the appended claims. Wherever possible, the same reference numbers will be used throughout the drawings and the following description to refer to the same or like parts.

Introduction

In accordance with methods and systems consistent with the present invention, a query server is provided that receives a query from a user of a client computer using a client program such as Netscape Navigator or Microsoft Internet Explorer. The query server receives the query from the client. computer either directly or, alternatively, via one or more intermediary computers such as one operated by an Internet access provider, an on-line service, etc. Although the client program may generate a query at one computer, the results of the query may be returned by the query server to another computer. The format of the query can take any of a number of forms (e.g., with switches in a command line or check boxes in a graphical user interface).

The query results in the generation of a response indicating, for example, that a specified Internet host name (e.g., apple) has been registered in a specified domain (e.g., the sub-domain .co within the country-level domain .uk), resulting in a domain name (e.g., apple.co.uk).

System Components

Figure 1:
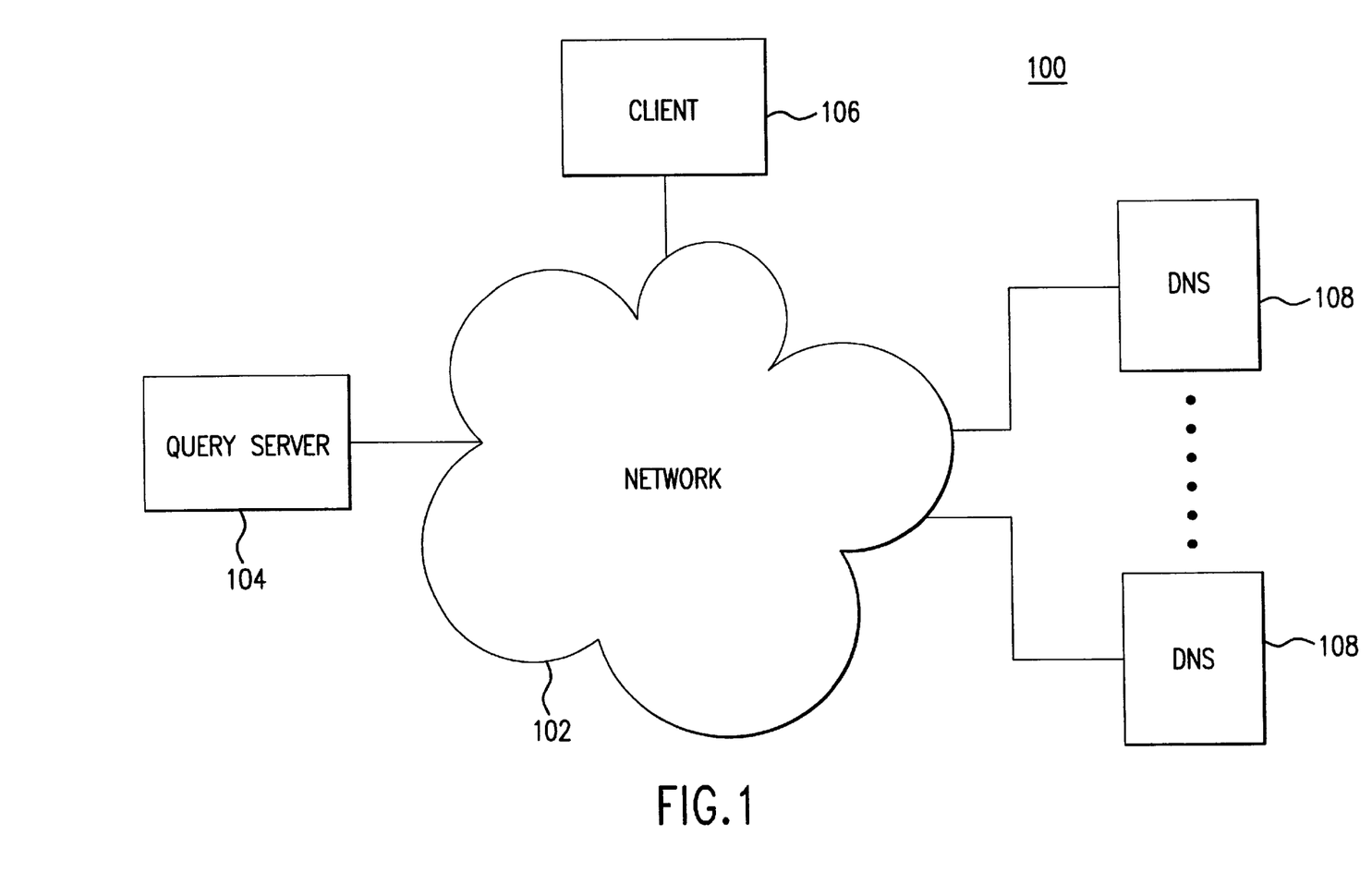
FIG. 1 depicts a data processing system suitable for practicing methods and systems consistent with the present invention.

FIG. 1 depicts a data processing system 100 suitable for practicing methods and systems consistent with the present invention. Data processing system 100 includes a client computer 106, a query server 104, and a number of DNS servers 108 interconnected via network 102. The client computer 106 is used by the user to submit queries to query server 104. Query server 104 receives the queries from the client computer 106 and performs these queries on DNS servers 108. Query server 104 may also contain Hyper Text Markup Language (HTML) code for transfer to a browser on the client computer 106. DNS servers 108 contain a domain name database that associates DNS records with domain names. A DNS record contains a domain name and the associated numerical address. DNS records may also contain textual information regarding the domain name. For example, a DNS record may indicate a contact person for a paricular domain name. DNS servers 108 receive query requests from the query server 104 and search the domain name database for a DNS record associated with the domain name. Although only one client computer 106 is depicted, one skilled in the art will appreciate that data processing system 100 may contain many more client computers.

Figure 2:
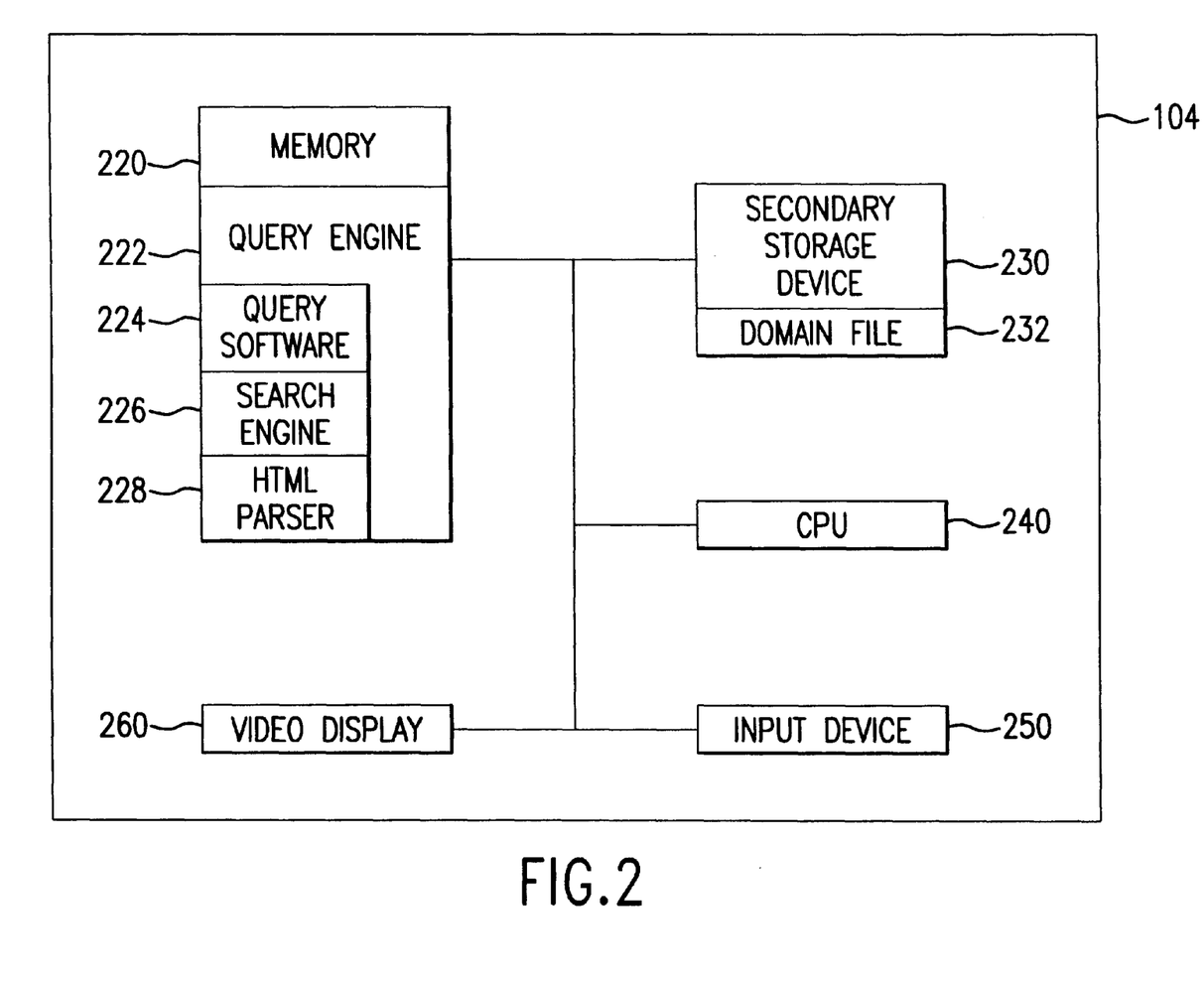
FIG. 2 depicts a more detailed diagram of the query server depicted in FIG. 1.

FIG. 2. depicts a more detailed diagram of query server 104. Query server 104 contains a memory 220, a secondary storage device 230, a central processing unit ("CPU") 240, an input device 250, and a video display 260. Memory 220 includes domain name query engine 222 that interacts with client computer 106 and DNS servers 108. Query engine 222 includes query software 224 that submits search requests to various DNS servers 108 located throughout the network. One example of the query software may be a UNIX utility tool called "nslookup" available on most UNIX platforms. Alternatively, query software 226 may be a script to interact with various Domain Name Servers. Query engine 222 also includes search engine 226 that uses a forking system to perform domain name queries in parallel. The forking system initiates multiple sub-processes to perform a subset, of the queries once the query process has begun. The forking system reduces the total time to complete a seach since multiple sub-processes will perform the queries in parallel. Query engine 222 further includes HTML parser 228 that parses HTML form parameters passed to and from the client browser when a search is submitted to the search engine 226. Search engine 226, query software 224 and HTML parser 228 are preferably written in the PERL environment available for download from Internet sites, such as "http://www.perl.com."

Secondary storage device 230 includes a domain file 232 that includes a listing of the available domains used by the search engine to create the queries. Also included in domain file 232 is a domain extension suffix to append to the domain name to create a full domain name to be searched. For example, the domain extension suffix ".co.uk" when combined with the domain name "apple" will create the full domain name "apple.co.uk." Domain file 232 may also contain the numerical address of a DNS server for each domain and whether the domain supports a Whois query. Moreover, domain file 232 may also optionally include other fields for specialized searches, such as Gross it Domestic Product (GDP) or whether the domain is a member of European Union or a Western country. These specialized fields allow the user to create a specialized domain name search in various environments. For example, a user may select to search for a domain name located in a top 50 GDP country. One skilled in the art will appreciate that other specialized fields may exist, including Asian countries or even high Internet usage countries.

Figure 3:
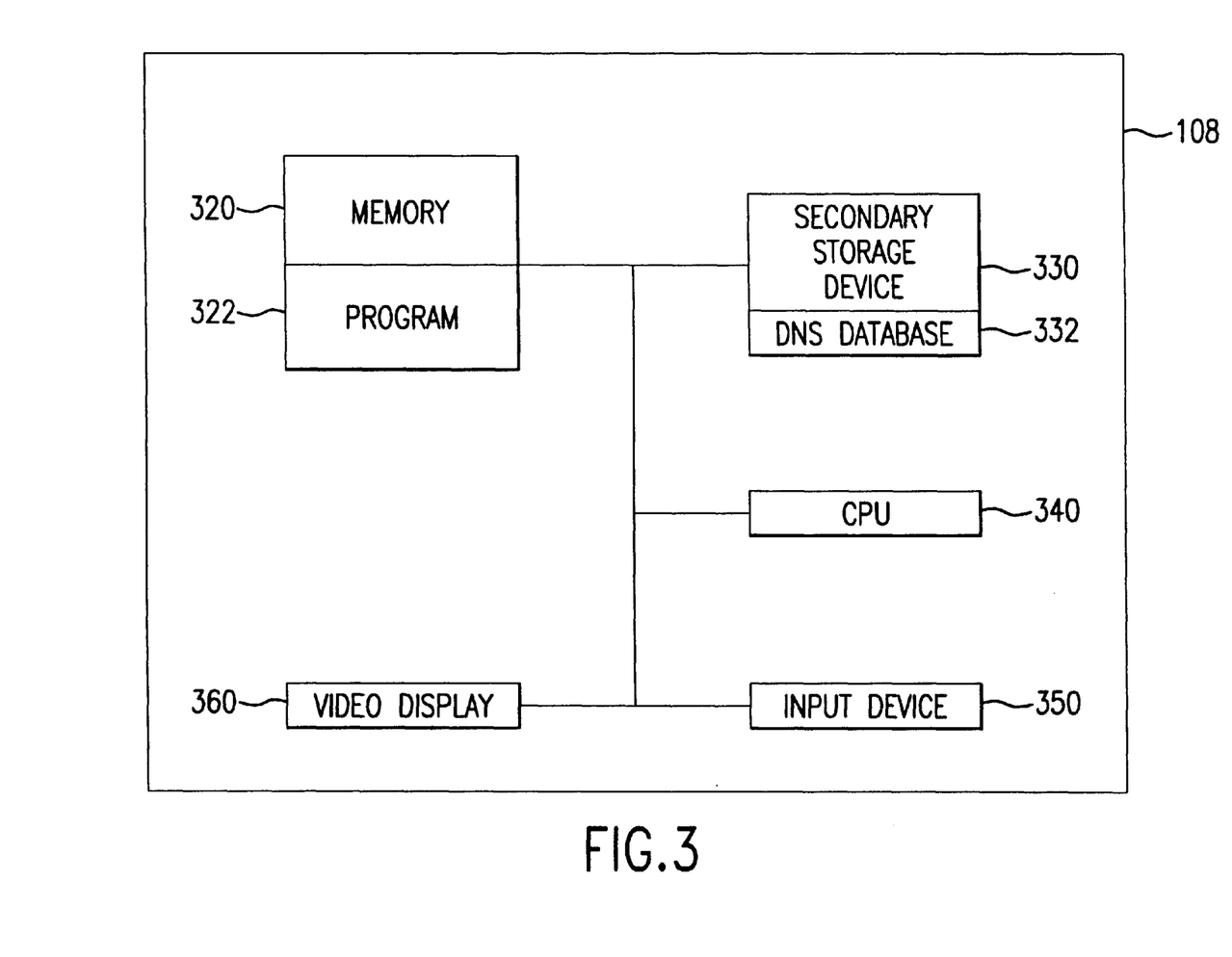
FIG. 3 depicts a more detained diagram of one of the DNS servers depicted in FIG. 1.

FIG. 3 depicts in greater detail an exemplary DNS server 108. DNS server 108 contains a memory 320, a secondary storage device 330, a central processing unit ("CPU") 340, an input device 350, and a video display 360. Secondary storage device 330 includes DNS server database 332 containing resource records that describe all the registered domain names within it's zone. A "zone" contains the domain names and data that a domain contains, except for domain names and data that are delegated to a sub-domain. For example, the domain "ca" (for Canada) may have the sub-domains "ab.ca" (Alberta), "on.ca" (Ontario), and "qb.ca" (Quebec). Authority for the "ab.ca," "on.ca," and "qb.ca" domains may be delegated to the DNS servers in each of the provinces. The domain "ca" contains all the data in "ca" plus all the data in "ab.ca," "on.ca," and "qb.ca." However, the zone "ca" contains only the data in "ca". In other words, the domain name "apple.ca" is listed in the "ca" DNS server database, while the domain name "apple.qb.ca" is listed in the "qb.ca" DNS database. Memory 320 includes program 322 that receives search requests from query server 104 for searching and retrieving information about the domain name from DNS database 332. One example of program 322 may be Berkeley Internet Name Domain (BIND) implementation of DNS available for download from the Internet Software Consortium at "http://www.isc.org."

Although aspects of the present invention are described as being stored in memory, one skilled in the art will appreciate that these aspects may be stored on or read from other computer-readable media, such as secondary storage devices, like hard disks, floppy disks and CD-ROM; a carrier wave received from a network like the Internet; or other forms of ROM or RAM. Additionally, although specific components and programs of query server 104 and DNS server 108 have been described, one skilled in the art will appreciate that a query server or a DNS server suitable for use with methods and systems consistent with the present invention may contain additional or different components.

Domain Name Searching Process

Figure 4:
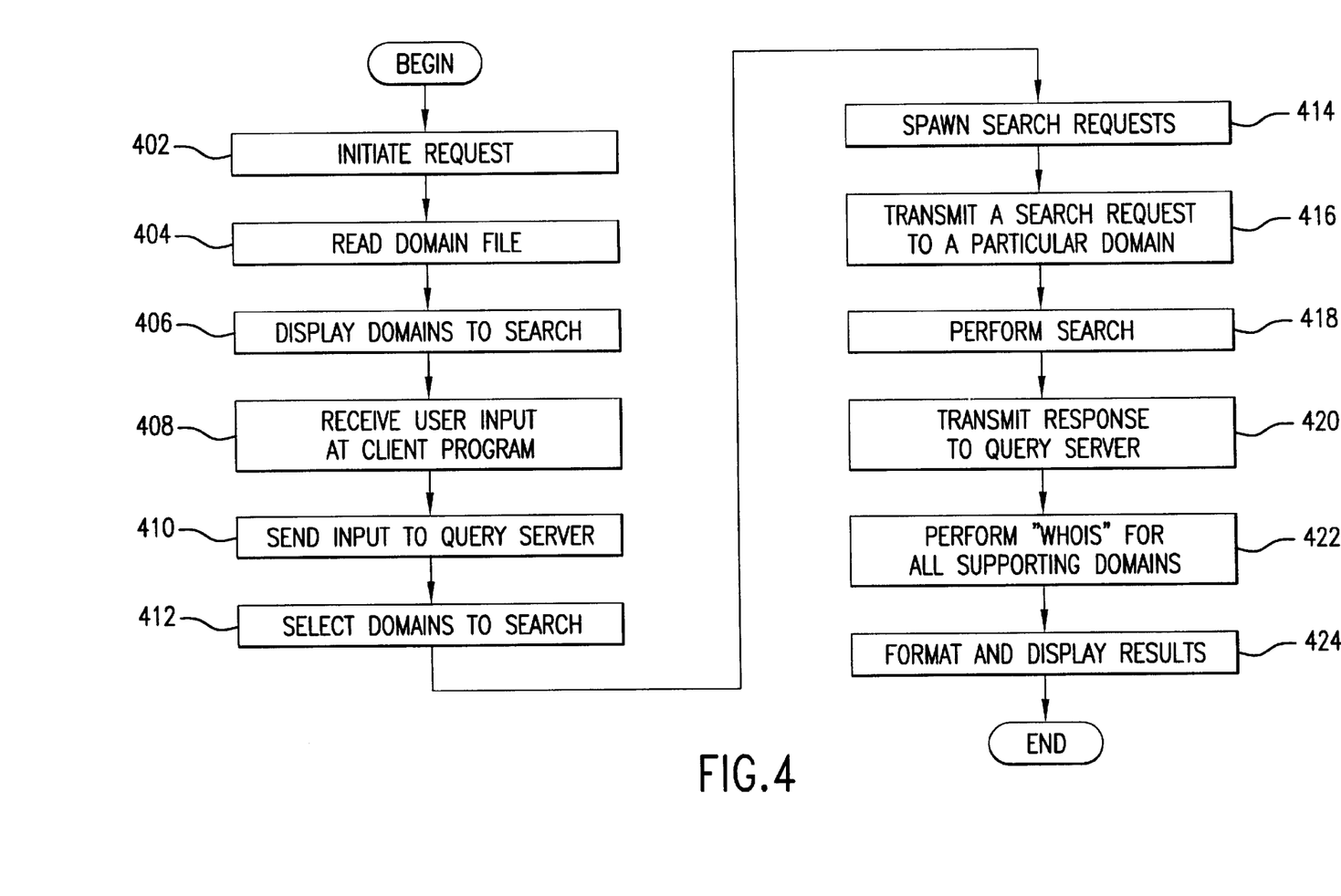
FIG. 4 depicts a flow chart of the steps performed by the query engine of FIG. 1 when searching for registered domain names in accordance with methods and systems consistent with the present invention.

Further details on operation of the search process will now be explained with reference to the flow chart of FIG. 4. The domain name search process is initiated, for example, by a request from client computer 106 to perform a search for a domain name (step 402). For example, client computer 106 may send an HTML request to query engine 104 using the well known Hypertext Transfer Protocol. Once the request is received, query engine 222 interrogates domain file 232 (step 404) and transmits all possible domains to search and the accompanying specialized fields in an HTML format to display on client computer 106 (step 406). That is, query engine 222 transmits a possible domain to search ".uk" with an identification that the domain is part of the European Union and also from a top 50 GDP country.

Figure 5A:
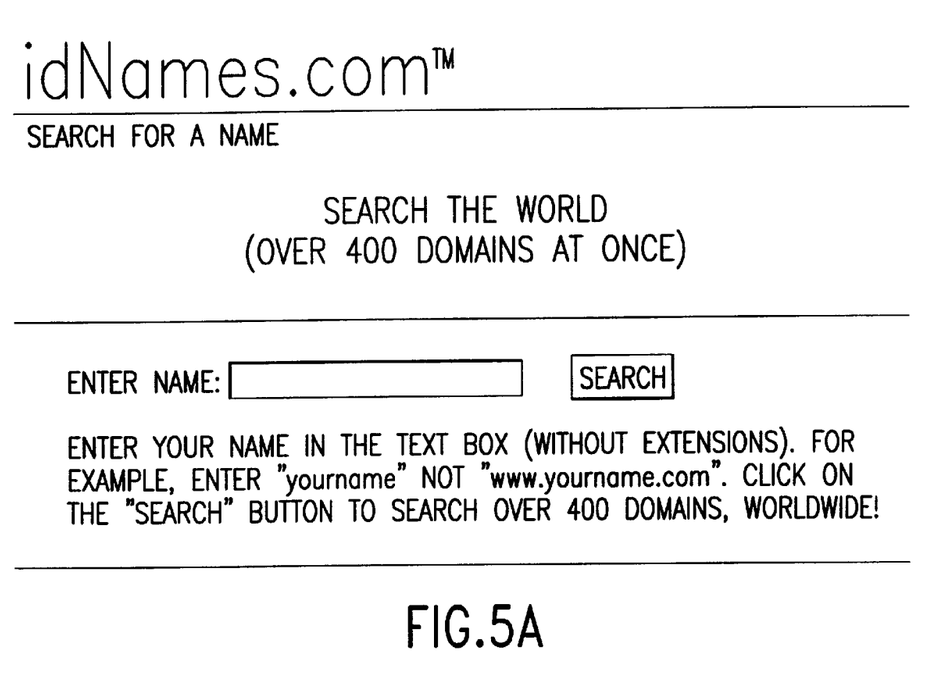
FIGS. 5a–5b depict a user interface in accordance with methods and systems consistent with the present invention.
Figure 5B:
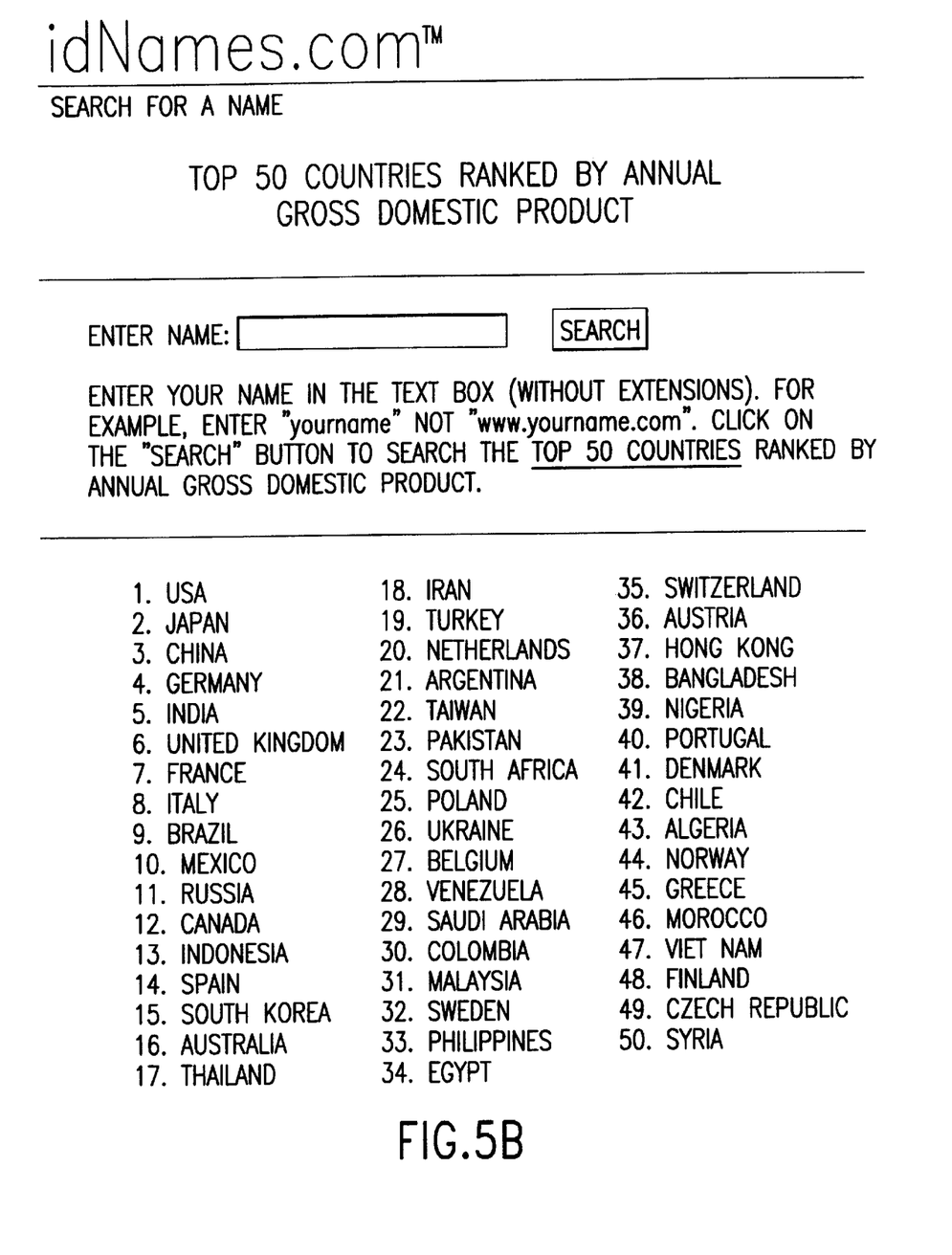

Once displayed, a user using client computer 106 enters a domain name to search, for example "apple," and a type of search to be performed, for example "top 50 GDP countries" (step 408). A user may request a search for registered domain names in all domains, as shown in FIG. 5a. Alternatively, the user may request a specialized search. That is, a search for a registered domain name in a set of domains based on the accompanying specialized fields. For example, a user may request to search in only the top 50 countries ranked by annual GDP, as depicted in FIG. 5b. One skilled in the art will appreciate that other combinations of domain selections exists, for example Western countries, Asian countries or a customized search, in that the user at client computer 106 may select a subset of domains to search from the total number of domains.

Upon the user at client computer 106 entering a domain name to search, client computer 106 sends the user input to query server 104 (step 410). Once received at query server 104, HTML parser 228 parses a listing of domains and a domain name to search submitted by the client computer 106 (step 412). Query engine 222 then invokes search engine 226 to spawn a number of search sub-processes (step 414). In this step, search engine 226 calculates the number of search sub-processes to spawn based on the number of domains to query submitted by client computer 106 so that each search sub-process contains at most 11 domains to search. Essentially, search engine 226 forks the queries into multiple sub-processes to perform the domain name searches in parallel for optimized performance. Each spawned search sub-process is given a subset of domains to query, thus query server 104 may perform multiple queries at once. For example, if client browser 106 selects 50 domains to query, search engine 226 may spawn 5 search sub-processes, so that each spawned search sub-process queries 10 DNS servers. Further, depending on the load of query server 104, search engine 226 may change the number of search sub-processes to spawn.

Once the search processes are spawned, a separate section of query engine 222, query software 224, transmits, to a DNS server for the domain in question (e.g., a DNS server 108 for .qb.ca or for .com), a request ifor a search of a domain-name database for a DNS record associated with the domain name (step 416). The transmission of the search request could be direct, but more likely will be relayed through one or more intermediary machines. For example, a search request generated by a query server in Houston could be transmitted to London; then to Moscow, and then to Zimbabwe, where the target DNS server 108 might be located.

In response to the search request, the DNS server 108 searches its domain-name database for a DNS record associated with the specified domain name (step 418). The DNS server 108 generates a response that indicates whether a DNS record was found for that domain name.

Query server 104 ultimately receives the response from DNS server 108 (step 420) and keeps a record of all responses from the DNS servers 108 until all responses have been received. If a response indicates that the domain-name database contains a DNS record associated with the domain name, query engine 222 flags that response signifying that the domain name has indeed been registered in the specified domain for further inquiry. This response is referred to as an "unavailability response." The unavailability response provides the user,with at least some indication (although not necessarily a conclusive one) that the domain name might not be available to be adopted in the domain in question.

Once all of the DNS servers 108 have responded with information about domain-name unavailability, query engine 222 performs a subsequent query for all registered domain names that support a Whois query (step 424). Using Whois, query software 226 can also learn additional information about a domain name. Query engine 222 invokes query software 226 to perform a Whois query in the domains that returned an unavailable response for a particular domain name. Domain file 232 contains a listing of domains supporting the Whois queries, since not all domains support Whois functionality.

Finally, in step 424, the results from the initial query and/or supplemental Whois query are presented to the user in a suitable display format. In either case, query engine 222 collects, sorts and formats the results for display to client computer 106. The results may be displayed in an HTML format.

Figure 6B:
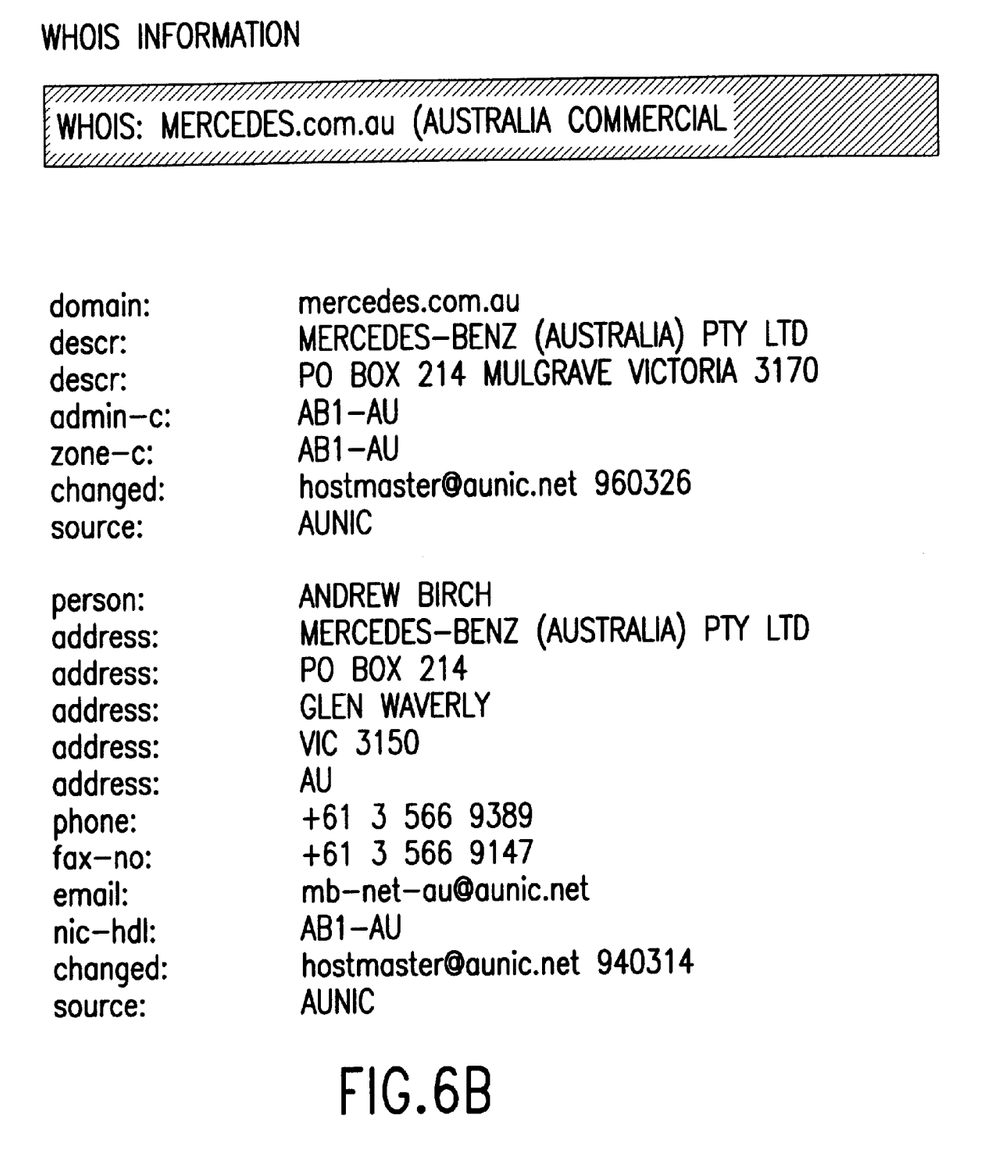
Figure 6C:
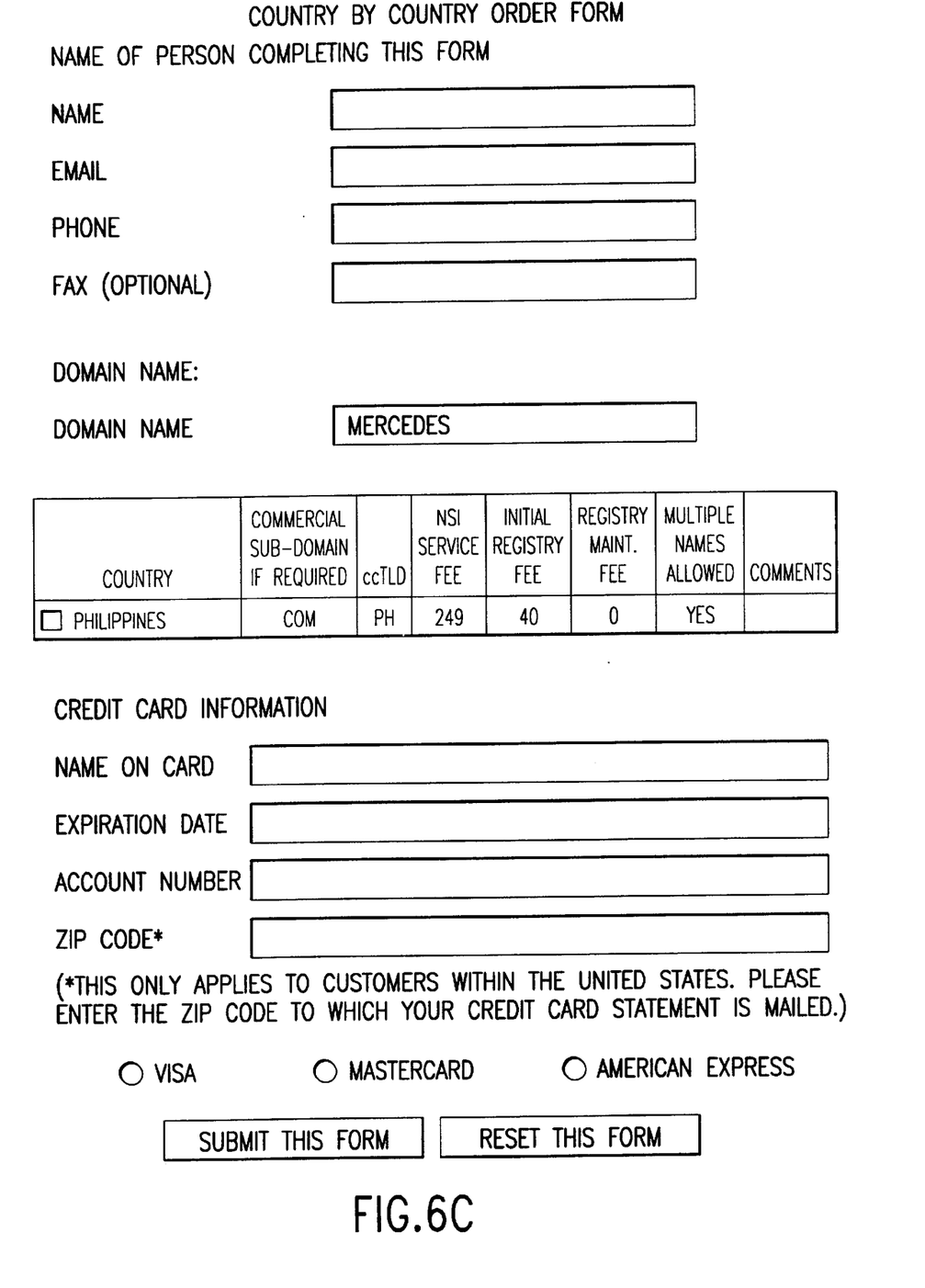

FIGS. 6a and 6b depict the results displayed to the user. FIG. 6a depicts an HTML display presented to the user using client computer 106 for search results 602. In this particular search, the user requested a domain name specialized search in all Asian and Pacific countries for the domain name "Mercedes." Items 604 indicate domains for which the domain name is currently unavailable, while items 606 indicate domains for which the domain name is available. If desired, a user may request to register a domain iname as indicated by item 606 by selecting item 610. That is, item 610 links a user to an HTML order form, as shown in FIG. 6c, for the specified domain. The order form dynamically creates an order request for: a particular domain name in the specified domain. The user supplies information, such as credit card and contact information, and once all the information is entered, the user may submit the order form to the appropriate registering service by email or by the well known hypertext transport protocol in order to begin the registration process. Also, Item 608 indicates that the domain ".com.au" supports the Whois functionality and contains further details on the administration for the domain name "Mercedes." By selecting item 608, a user will view the supplemental, Whois queries for all domains supporting Whois functionality, as shown in FIG. 6b.

Also if desired, the query server can develop and maintain a centralized data store of "taken" domain names indicating which domain names have been registered and in which domain(s) they are registered. In response to a user's query, the query server can then search the centralized data store to make a quick, first-pass determination whether the domain name of interest has been "taken."

Conclusion

Methods and systems consistent with the present invention search for registered domain names in a plurality of domains by transmitting a request to search a domaini-name database to selected domains. One of the advantages to searching domains in this manner is that the query server can send search requests to many top-level Domain Name Servers (e.g., uk, .fr, .de, and so on) so that the searches can be performed quickly and, from the user's perspective, essentially simultaneously. This searching capability is available to any Web enabled client browser, UNIX or many other operating systems. For example, a domain name search may be implemented by a command line instruction. Methods consistent with the present invention also work well with multi-processor machines. On a multi-processor machine, a search may show up on more than one processor thread. Finally, systems consistent with the present invention can work well with domain name search engines written in C++, Perl, C or even Java programming languages.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone.

What is claimed is:

1. A method in a data processing system with DNS servers, each responsible for maintaining registration records of domain names for an associated domain, comprising:

receiving user input containing a domain name, a plurality of domains and at least one search criterion corresponding to the plurality of domains;

transmitting a request for a search of the domain name to each of the DNS servers associated with the plurality of domains;

receiving search results from each of the DNS servers associated with the plurality of domains indicating, for each of the specified domains, whether a domain name record exists for the domain name in the specified domain; and displaying the search results.

2. The method of claim 1, wherein the results are sorted and formatted in a hypertext markup language.

3. The method of claim 1, wherein the transmitting step further includes:

determining a number of search processes to spawn based on a number of specified domains; and spawning the number of the search processes, wherein each search process queries at least one of the DNS servers.

4. The method of claim 1, wherein the receiving user input step includes:

reading a domain file to determine available domains; and displaying the available domains to a user to enable the user to indicate the specified domains.

5. The method of claim 1, wherein the receiving user input step includes:

displaying a predetermined number of domains based on the at least one search criterion; and indicating at least one of the predetermined number of domains as the specified domains.

6. The method of claim 1, further comprising:

determining whether the domain name record exists for the domain name for each specified domain; and performing a query to obtain registration information for the domain name when the domain name record exists.

7. The method of claim 1, further comprising:

displaying an order form for registering the domain name in a specified domain.

8. A method in a data processing system with DNS servers, each responsible for maintaining registration records of domain names and other specialized fields for an associated domain, comprising:

receiving user input containing a domain name, a plurality of domains, and at least one search criterion corresponding to the plurality of domains;

transmitting a first request to a first DNS server to determine whether a domain name record exists in the domain associated with the first DNS server, said first request comprising said domain name and a first domain;

simultaneously transmitting a second request to a second DNS server to determine whether a domain name record exists in the domain associated with the second DNS server, said second request comprising said domain name and a second domain;

receiving search results from the first request and the second request indicating whether the domain name record exists in the domain associated with the first DNS server and indicating whether the domain name record exists in the domain associated with the second DNS server; and displaying the search results to a user.

9. A data processing system comprising:

a plurality of DNS servers, each DNS server configured to maintain registration records of domain names and other specialized fields for an associated domain; and a query server containing:

a memory with a program configured to:

receive user input containing a domain name, a plurality of domains, and at least one search criterion corresponding to the plurality of domains;

transmit a request for a search of the domain name to each of the DNS servers associated with the plurality of domains; and receive search results from each of the DNS servers associated with the plurality of domains indicating, for each of the specified domains, whether a domain name record exists in the specified domain;

a display configured to display the search results; and a processor configured to run the program.

10. The data processing system of claim 9, wherein the program sorts and formats the search results in a hypertext markup language.

11. The data processing system of claim 9, wherein program contains a spawn component configured to determine a number of search processes to spawn based on a number of specified domains, and configured to spawn the number of the search processes, wherein each search process queries at least one of the DNS servers.

12. The data processing system of claim 9, wherein the program contains a component configured to:

display a predetermined number domains based on the at least one search criterion, and receive an indication of at least one of the predetermined number of domains as the specified domains.

13. The system of claim 9, wherein the program contains a registration component configured to:

examine the search results to determine whether a domain name record exists for each of the specified domains, and configured to perform a query on each DNS server to obtain registration information for the domain name when the domain name record exists.

14. The system of claim 9, wherein the program contains an order component configured to:

create an order form for registering the domain name in a specified domain.

15. A computer-readable medium containing instructions, for controlling a data processing system to perform a method, the data processing system having DNS servers, each responsible for maintaining registration records of domain names and other specialized fields for an associated domain, the method comprising:

receiving user input containing a domain name, a plurality of domains, and at least one search criterion corresponding to the plurality of domains;

transmitting a request for a search of the domain name to each of the DNS servers associated with the plurality of domains;

receiving search results from each of the DNS servers associated with the plurality of domains indicating, for each of the specified domains, whether a domain name record exists in the specified domain; and displaying the search results.

16. A method in a data processing system with DNS servers, each responsible for maintaining registration records of domain names for an associated domain, comprising:

receiving user input containing a domain name and specified ones of the domains, wherein the domains have an associated country with a gross domestic product;

displaying a predetermined number of domains based on the gross domestic product of the associated countries;

indicating at least one of the predetermined number of domains as the specified domains;

transmitting a request for a search of the domain name to the DNS servers associated with the specified domains;

receiving search results from the DNS servers associated with the specified domains indicating, for each of the specified domains, whether a domain name record exists for the domain name in the specified domain; and displaying the search results.

17. A data processing system comprising:

a plurality of DNS servers, each DNS server configured to maintain registration information of domain names for an associated domain wherein each domain has an associated country with a gross domestic product;

a query server containing:

a memory with a program configured to receive user input containing a domain name and specified ones of the domains;

transmit a request for a search of the domain name to the DNS servers associated with the specified domains, receive search results from the DNS servers associated with the specified domains indicating, for each of the specified domains, whether a domain name record exists in the specified domain;

display a predetermined number of domains based on the gross domestic product of the associated countries, and receive an indication of at least one of the predetermined number of domains as the specified domains;

a display configured to display the search results; and a processor configured to run the program.

* * * * *

UNITED STATES PATENT AND TRADEMARK OFFICE
CERTIFICATE OF CORRECTION

PATENT NO. : 6,560,634 B1
APPLICATION NO. : 09/133836
DATED : May 6, 2006
INVENTOR(S) : Larry Joe Broadhurst It is certified that error appears in the above-identified patent and that said Letters Patent is hereby corrected as shown below:

| Column | Line | |
|---|---|---|
| 3 | 60 | Change "paricular" to --partciular-- |
| 4 | 14 | Change "seach" to --search-- |
| 4 | 48 | Change "it's" to --its-- |
| 6 | 1 | Change "ifor" to --for-- |
| 6 | 24 | Change "user,with" to --user with-- |
| 6 | 52 | Change "iname" to --name-- |
| 6 | 56 | Change "for: a" to --for a-- |
| 7 | 10 | Change "domaini-name" to --domain name-- |

Signed and Sealed this

Twentieth Day of February, 2007

JON W. DUDAS
*Director of the United States Patent and Trademark Office*